United States Patent [19]

Ersfeld et al.

[11] Patent Number: 4,477,191
[45] Date of Patent: Oct. 16, 1984

[54] MIXING HEAD FOR MIXING AT LEAST TWO FLOWABLE COMPONENTS

[75] Inventors: Heinrich Ersfeld; Klaus Schulte, both of Leverkusen, Fed. Rep. of Germany

[73] Assignee: Bayer Aktiengesellschaft, Leverkusen, Fed. Rep. of Germany

[21] Appl. No.: 485,975

[22] Filed: Apr. 18, 1983

[30] Foreign Application Priority Data

May 6, 1982 [DE] Fed. Rep. of Germany ....... 3217016

[51] Int. Cl.³ .............................................. B29B 1/04
[52] U.S. Cl. ..................... 366/77; 222/137; 222/145; 222/149; 222/564; 366/96; 366/176; 366/193; 366/341
[58] Field of Search ................... 366/76, 96, 138, 152, 366/160, 161, 176, 177, 192, 193, 184, 341, 349; 222/130, 136, 137, 145, 149, 309, 318, 322, 380, 409, 561, 564, 600; 137/242; 141/107; 425/130, 217, 257

[56] References Cited

U.S. PATENT DOCUMENTS 4,141,470 2/1979 Schulte et al. ..................... 222/137
4,332,335 6/1982 Fiorentini ........................... 222/145

FOREIGN PATENT DOCUMENTS 2847504 5/1980 Fed. Rep. of Germany.

Primary Examiner—Timothy F. Simone
Attorney, Agent, or Firm—Gene Harsh; Joseph C. Gil

[57] ABSTRACT

The instant invention is directed to a mixing head for mixing at least tw flowable components which preferably form a foam during their reaction. The mixing head comprises a housing, in which a guide bore for a discharge piston is positioned, one section of this guide bore being designed as a mixing chamber, into which nozzle openings of injection members, positioned equidistant around the housing, discharge. In the mixing position of the discharge piston, the mixing chamber is bounded by the leading edge of the piston, with an outlet opening being provided opposite the piston. A choke member, which adjoins the mixing chamber and is movably positioned in a guide recess extending perpendicular to the guide bore and transversely beyond the axis or plane of the injection members, has a passage, the cross section of which corresponds to the cross section of the discharge piston such that the piston may enter this passage in its cleaning position. Further, the guide recess and the choke member have sections of reduced cross-sectional areas toward the mixing chamber, these sections extending into the mixing chamber, but leaving the mixing chamber clear.

10 Claims, 12 Drawing Figures

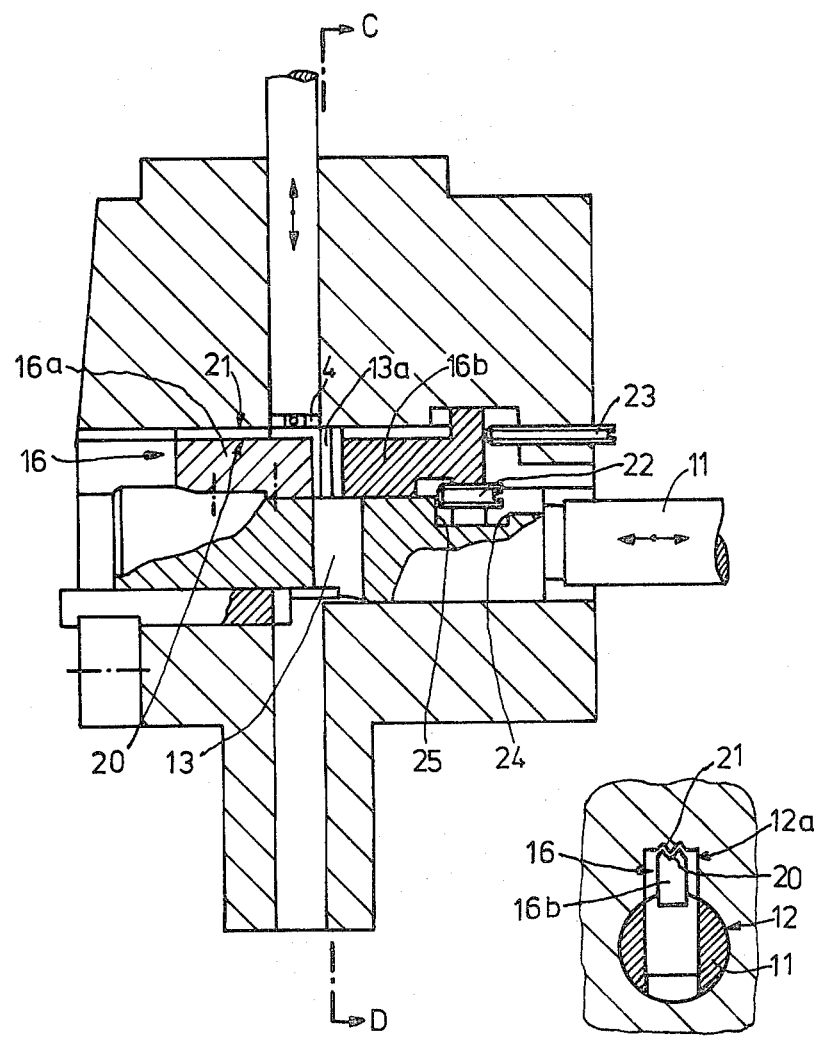

MIXING HEAD FOR MIXING AT LEAST TWO FLOWABLE COMPONENTS

This invention relates to a mixing head for mixing at least two flowable components which preferably form a foam during their reaction. The mixing head comprises a housing, in which a guide bore for a discharge piston is positioned, one section of this guide bore being designed as a mixing chamber, into which nozzle openings of injection members, positioned equidistant around the housing, discharge. In the mixing position of the discharge piston, the mixing chamber is bounded by the end face of the piston, with an outlet opening being provided opposite the piston. A choke member, which adjoins the mixing chamber and is movably positioned in a guide recess extending perpendicular to the guide bore and transversely below the axis or plane of the nozzle openings of the injection members, has a passage, the cross section of which at least equals the cross section of the discharge piston, such that the piston may enter this passage in its cleaning position, and also a section of reduced cross-sectional area adjacent to the mixing chamber.

BACKGROUND OF THE INVENTION

Mixing heads having a choke design have been used, in particular, for the preparation of reaction mixtures for the production of moldings in processes which require exact mixing of the reaction components from the beginning to the end of the continuous mixing procedure. Technological advances in the production of moldings require, to an increasing extent, however, that reaction components of a higher viscosity are processed at lower throughput capacities-to way below 50 g of reaction mixture/sec.

With these requirements, previously-known mixing heads (such as the mixing head disclosed in German Auslegeschrift No. 2,612,812 (corresponding to U.S. Pat. No. 4,141,470), the choke member of which is designed as a lifting valve, or the mixing head in German Offenlegungsschrift No. 2,847,504, in which the choke member is in the form of a rotary valve) have the disadvantage that the volume of the mixing chamber which is formed between the choke member and the discharge piston is too large for faultless mixing.

The cross section of the mixing chamber cannot be reduced because the diameter of the discharge piston must not fall below a certain minimum. A thin, completely-reacted film of mixture builds up between the discharge piston and the guide bore therefor, which film may block the stroke movement of the piston. If the piston is too small, it may bend due to the charging force which is applied and the mixing head may be destroyed.

In order to reliably rule out the possibility of a collision between the discharge piston and the choke member, the cleaning stroke of the piston may only begin once the choke member has come to rest in the cleaning position. For this reason, after the injection nozzles have been closed, the remainder of the mixture which is still in the mixing chamber cannot flow away via the passage in the choke and does not undergo a subsequent mixing in the outlet passage. The end product frequently exhibits a defective area, the volume of which corresponds to the volume of that remaining mixture.

Since the discharge pistons in the mixing heads of the prior art have necessarily had minimum diameters, as described above, choke members were therefore also required to have such widths or diameters that sufficiently thick structural pieces would be present on all sides of its passage. Due to these necessary dimensions, and the positioning of the bodies of the injection members on the sides of the mixing chamber in the mixing head housing, it has been impossible for the known choke members to be positioned close enough to the nozzle openings to reduce the volume of the mixing chamber.

The object of the present invention is to provide a mixing chamber having a volume which is as small as possible, in order to achieve perfect mixing even when higher-viscosity components are processed, including when there are lower throughput capacities.

This object is achieved in that the guide recess and the choke member therein have sections of reduced cross-sectional area toward the discharge piston guide bore and mixing chamber, and extend up between the injection members, ending just below and leaving the nozzle openings clear.

BRIEF DESCRIPTION OF THE DRAWINGS

FIG. 4 illustrates a second embodiment of the mixing head in longitudinal section;

FIG. 5 illustrates the mixing head along line C/D in FIG. 4;

DESCRIPTION OF THE INVENTION

Figure 1:
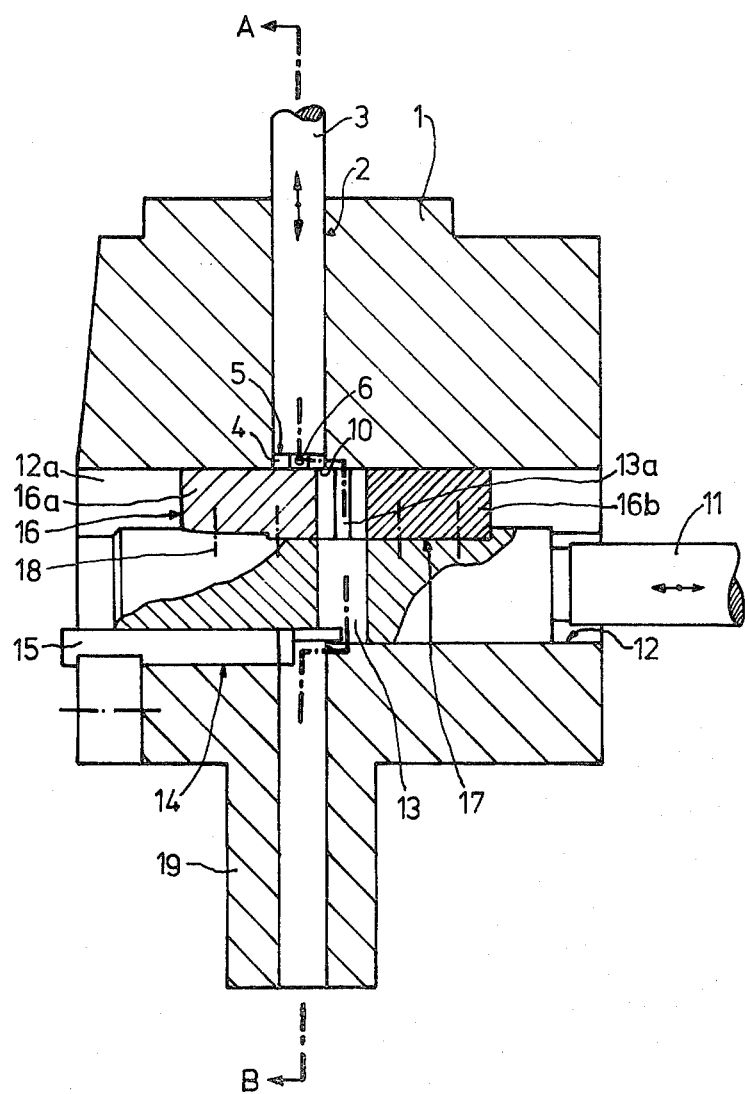
FIG. 1 illustrates a first embodiment of the mixing head in longitudinal section.

The instant invention is directed to a mixing head for mixing at least two flowable components which preferably form a foam during their reaction. The mixing head comprises a housing, in which a guide bore for a discharge piston is positioned, one section of this guide bore being designed as a mixing chamber, into which nozzle openings of injection members, positioned equidistant around the housing discharge. In the mixing position of the discharge piston, the mixing chamber is bounded by the end face of the piston, with an outlet opening being provided opposite the piston. A choke member, which adjoins the mixing chamber and is movably positioned in a guide recess extending perpendicular to the guide bore and transversely below the axis or plane of the injection members, has a passage, the cross section of which corresponds to the cross section of the discharge piston such that the piston may enter this passage in its cleaning position. Further, the guide recess and the choke member have sections for reduced crosssections and toward the mixing chamber, these reduced area sections possibly extending into the mixing chamber, but always leaving the mixing chamber clear.

More particularly, the instant invention is directed to a mixing head for mixing at least two flowable components comprising:

(A) a housing having
  (i) a discharge piston guide bore therein, (ii) a mixing chamber in one section of said discharge piston guide bore into which nozzle openings of injection members for said flowable components, positioned equidistant around said mixing chamber, discharge, said mixing chamber further defined as having an outlet opening, (iii) a choke member guide recess extending perpendicular to said discharge piston guide bore and transversely beyond said nozzle openings, and (iv) an outlet passage coaxial with said discharge piston guide bore and beyond said choke member guide recess;

(B) a discharge piston slidably disposed in said discharge piston guide bore, and slidable through said mixing chamber, said choke member guide recess, and said outlet passage; and (C) a choke member slidably disposed in said choke member guide recess and having a passage therethrough and a section adjacent to said mixing chamber which has a reduced cross-sectional area.

As a result of this section of reduced crosssectional area, the volume of the mixing chamber may be substantially reduced, compared to the chambers described in the prior art. In the design according to the present invention, the amount of mixture which remains in the chamber after the injection nozzles have been closed is so small that it can significantly reduce the defective area in the end product. It is only the new embodiment of the choke member or of the guide recess thereof which allows the necessary reduction in the mixing chamber, without losing the former advantages of the choke member.

The maximum width of the section of reduced cross-sectional area at the point closest to the mixing chamber preferably corresponds to the diameter of the guide bore discharge piston.

This embodiment allows the mixing chamber to be reduced to a minimum, where the height thereof corresponds to the diameter of the injection openings. If the point closest to the mixing chamber of the section of reduced cross-sectional area is designed to be narrower, the mixing chamber expands to include the pockets formed on both sides of the section of reduced crosssectional area. A mixing chamber which is divided in this manner may be advantageous for the mixing operation, particularly in the case of components which are especially difficult to mix. There are no difficulties in terms of cleaning either embodiment, because the surfaces of the choke or the choke guide recess which come into contact with the reaction mixture are selfstripping during the movement of the choke member, and the discharge piston cleans the walls of the piston guide bore. Accordingly, the guide recess and the section of reduced cross-sectional area of the choke member may thus extend very close to the nozzle openings.

In the case of a particularly narrow section of reduced cross-sectional area, this section may even extend up to the end face of the piston, when the piston is in the mixing position. However, in this case, the section of reduced cross-sectional area only projects into the mixing chamber to such an extent that the nozzle openings remain clear and point into the passage area of the section of reduced cross-sectional area of the choke member.

It is obvious that the section of reduced cross-sectional area or the complete choke member may have various cross sectional shapes, particularly depending on the mixing properties of the components to be processed, the relevant guide recess being designed accordingly. For example, a teardrop, a rounded-off teardrop shape, a trapenzoidal shape, a rectangular shape or a rhombic shape are all possible.

It is also possible to provide the surface of the section of reduced cross-sectional area closest to the mixing chamber with a profiling, such as grooves, running parallel to the axis of the guide. The seal is ensured by a cooperating design of the surface of the guide recess. A profiling of this type may promote the discharge of the mixture out of the mixing chamber into the passage by providing for several branch flows.

With respect to the construction of mixing heads, it is advantageous according to a particular embodiment for the section of reduced cross-sectional area to be formed as an attachment to the actual choke member. The attachment preferably (and when the section of reduced cross-sectional area narrows from the diameter of the mixing chamber, necessarily) comprises a pair of separate attachment pieces framing the pasaage between them. This attachment is also preferably exchangeable and may thus be replaced when worn.

According to one particular embodiment, the attachment, positioned displaceably on the choke member by an adjusting member, is arranged such that the position of the passage through the section of reduced cross-sectional area differs from the passage through the choke member during the mixing position of the piston. This measure provides favorable mixing and flow conditions due to the staggered flow passages through the attachment and the choke member.

According to another particular embodiment, only one attachment piece of the pair is attached to the actual choke member. This embodiment allows a change in the size of the passage through the attachment to be made. However, a reduction is only possible if the section of reduced cross-sectional area is narrower, over its complete height, than the diameter of the mixing chamber.

A separate adjusting member is preferably allocated to each attachment piece, thus providing the skilled practitioner with multiple adjustment possibilities in order to influence the flow conditions.

According to still another embodiment, the attachment comprises several plates which are positioned parallel, one on top of another, and are displaceable relative to each other. This embodiment allows a cascade-like adjustment of the passage, and several choke positions may also be produced inside the passage by designing individual plates as pairs with their independent adjustment possibility.

It is obvious that the novel design of the choke member with a passage may be applied, with all the variants, to a choke member designed as a lifting valve as well as to a choke member designed as a rotary valve.

The novel mixing head having a choke member designed as a lifting valve is illustrated schematically in several embodiments with the choke member in the mixing position, in the drawings, and is described in more detail in the following.

Figure 2:
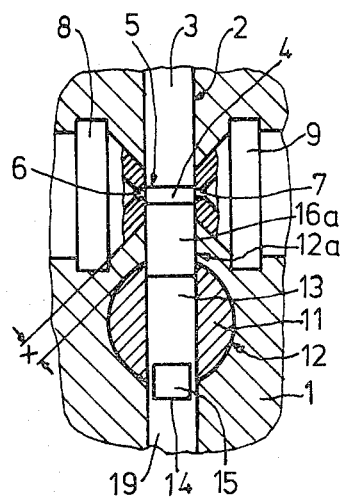
FIG. 2 illustrates the mixing head in section along line A/B in FIG. 1.
Figure 3:
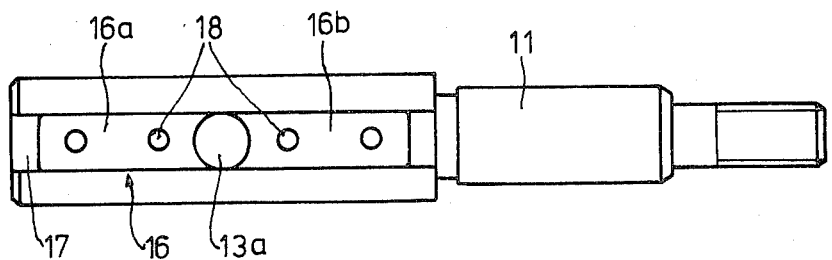
FIG. 3 illustrates the choke member of this mixing head in a top view.

The mixing head in FIGS. 1 to 3 comprises a housing 1, in which a guide bore 2 for a discharge piston 3 is positioned. One section of this guide bore 2 is designed as a mixing chamber 4 which is bounded by the end face 5 of the piston 3 when the piston is in the mixing position. Nozzle openings 6 and 7 of opposite injection members 8 and 9 discharge into the mixing chamber 4. The outlet opening 10 of the mixing chamber 4 is created by the movement of a choke member 11. This member 11 is movably positioned in a guide recess 12 which extends perpendicular to and transversely below the axis of the injection nozzles 8 and 9. The choke member 11 has a passage 13, the cross section of which corresponds to the cross section of the discharge piston 3, i.e., the cross-sectional shape and dimensions of the passage 13 are compatible with the cross-sectional shape and dimensions of the piston 3. Structural section X remains between the injection members 8 and 9 and the guide recess 12, and these ridges are thick enough to prevent a distortion of the housing 1 by the mixing pressure and also to prevent either a leakage occurring which is possibly associated therewith, or undesirable transverse forces being exerted on the piston. The choke member 11 is secured against twisting by a groove 14 and a spring 15. The choke member 11 has a section of reduced cross-sectional area 16 between itself and the mixing chamber 4, which is designed as an attachment. This section of reduced cross-sectional area 16 is adapted to part, 12a, of the guide recess 12. The attachment 16 itself comprises a pair of attachment pieces, 16a and 16b. The pieces, 16a and 16b, frame the part, 13a, of the passage 13 which extends through the attachment 16. Said pieces are designed as springs engaging in a groove 17 and are secured in a detachable manner by fixing pieces 18. Reference numeral 19 denotes the outlet tube. The discharge piston 3 and the choke member 11 may be actuated and controlled hydraulically in a co-ordinated manner.

An illustration of the mixing head with the choke member 11 and the discharge piston 3 in the cleaning position differs from the above drawings in that, in the cleaning position, the passages, 13 and 13a, must align with the guide bore 2.

The construction of the mixing head in FIGS. 4 and 5 substantially corresponds to that of the mixing head according to FIGS. 1 to 3. The same reference numerals have been used on the drawings and only the differences will be described.

The attachment 16 on the choke member 11 has a profiling 20 on its surface adjacent the housing running in the direction of movement of the choke member 11. The corresponding counter surface of the part, 12a, of the guide recess 12, in which attachment 16 is disposed, is provided with a corresponding cooperating profiling 21 for sealing purposes. The attachment 16 is narrower than the diameter of the mixing chamber 4. The attachment piece, 16a, is attached to the choke by fixing pieces, whereas the attachment piece, 16b, may be moved by adjusting pieces 22 and 23 and limited by stops 24 and 25. By these means, the passage, 13a, has a smaller cross section than passage 13 of the actual choke member 11 during the mixing procedure, but in the cleaning position (not shown) of the choke member 11, the attachment piece, 16b, adjusts to open passage 13a to the dimensions of guide bore 2.

Figure 6:
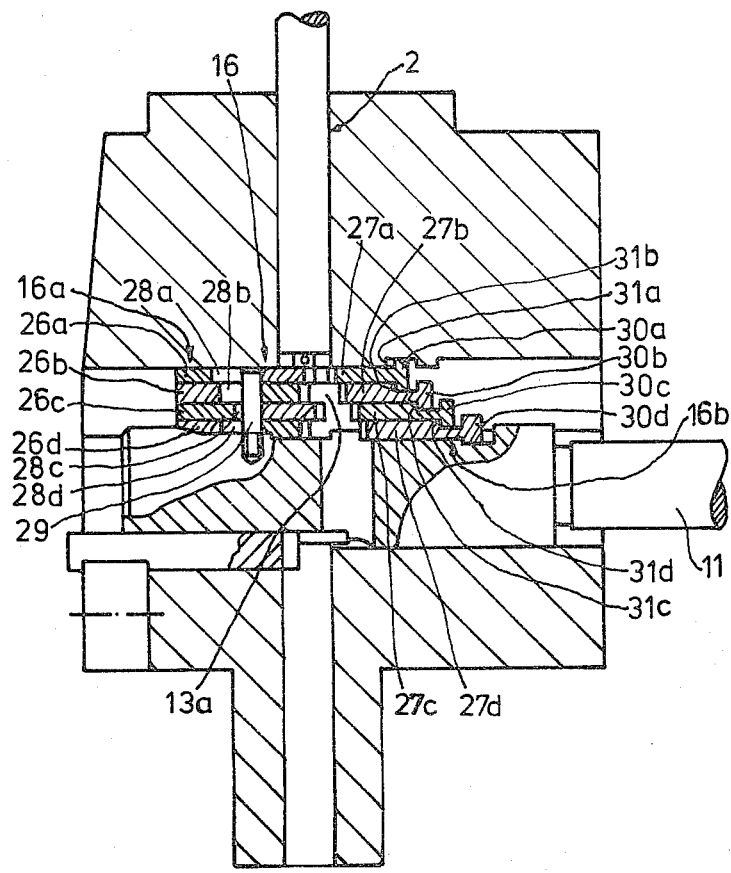
FIG. 6 illustrates a third embodiment of the mixing head in longitudinal section.

The embodiment of the mixing head according to FIG. 6 also only differs slightly from the mixing heads described hitherto. Again, the previous reference numerals have been used, and only the differences will be described.

The attachment 16 of the choke member 11 again comprises two attachment pieces, 16a and 16b, but each piece, 16a and 16b, is composed of several plates, 26a, 26b, 26c, 26d and 27a, 27b, 27c, 27d, respectively, which are positioned one on top of another. The plates 26a, 26b, 26c and 26d, have oblong openings, 28a, 28b, 28c, 28d, which differ in width and through which a connecting pin 29 extends. The driving pin 29 and the oblong openings, 28a, 28b, 28c, 28d, cooperate such that the attachment piece, 16a, has the desired contour along the passage, 13a, in the mixing position and such that in the cleaning position, the surfaces along the passage, 13a, align with the guide bore 2.

The plates, 27a, 27b, 27c, 27d, of the attachment piece, 16b, have driving heads, 30a, 30b, 30c, 30d, and interacting stops, 31a, 31b, 31c, 31d. In the mixing position of the choke member 11, the passage, 13a, of the attachment 16 has different cross sections or contours over its height, according to the position of the individual plates, 26a, 26b, 26c, 26d and 27a, 27b, 27c, 27d.

The most varied possibilities are available to the skilled practitioner for designing choke members with a section of reduced cross-sectional area, while bearing in mind that a sufficiently thick structural section of the housing must remain between the mixing chamber and the choke attachment for support reasons. A selection of possible emobdiments, for which corresponding guide recesses must, of course, be designed, is shown in FIGS. 7 through 12.

Figures 7, 8, 9, 10, 11, 12:
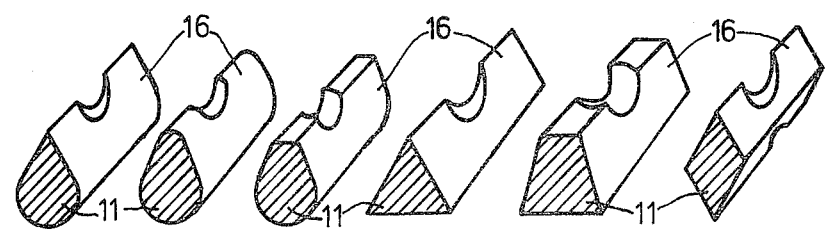
FIGS. 7 to 12 illustrate the choke member in various possible embodiments in cross section and in a spatial illustration.

FIG. 7 illustrates a choke member 11 designed as a lifting valve, which is produced, together with its triangle-shaped reduced area section 16, from one piece. The steeper and higher the section of reduced cross-sectional area 16, the further it can extend between the injection outlets.

In the case of the choke member 11 according to FIG. 8, the section 16 is parabolic, seen in cross section, or it is in the shape of a triangle with a rounded-off point.

According to FIG. 9, the taper 16 is trapezoidal in cross section.

The choke member 11 according to FIG. 10 is triangular.

The choke member 11 according to FIG. 11 is trapezoidal.

The choke member 11 according to FIG. 12 has a rhombic cross section.

An embodiment of the mixing head in which the choke member is designed as a rotary valve is easily conceived by those skilled in the art. In this case, the axis of the choke member must be positioned parallel to the common axis of the two injection nozzles. The section of reduced cross-sectional area is then to be positioned as a ring, or at least as a ring segment, of sufficient length on the casing of the rotary valve, such that it may engage in a desirable manner into the guide bore below the injection openings.

What is claimed is:

1. A mixing head for mixing at least two flowable components comprising:
  (A) a housing having
    (i) a discharge piston guide bore therein,
    (ii) a mixing chamber in one section of said discharge piston guide bore, nozzle openings of injection members for said flowable components positioned equidistant around said mixing chamber, said mixing chamber further defined as having an outlet opening,
    (iii) a choke member guide recess extending perpendicular to said discharge piston guide bore and transversely beyond said nozzle openings, and (iv) an outlet passage coaxial with said discharge piston guide bore and beyond said choke member guide recess;

(B) a discharge piston slidably disposed in said discharge piston guide bore, and slidable through (i) said mixing chamber, (ii) said choke member guide recess, and (iii) said outlet passage; and (C) a choke member slidably disposed in said choke member guide recess and having (i) a passage therethrough and (ii) a section adjacent to said mixing chamber which has a reduced crosssectional area, said section of reduced cross-sectional area extending into said mixing chamber between said nozzle openings but leaving said nozzle openings clear.

2. A mixing head according to claim 1, characterized in that the maximum width of said section of reduced cross-sectional area at the point closest to said mixing chamber corresponds to the diameter of said discharge piston guide bore.

3. A mixing head according to claim 1, characterized in that the guide recess and said section of reduced cross-sectional area extend closely up to said nozzle openings.

4. A mixing head according to claim 1, characterized in that said section of reduced crosssectional area is formed by a replaceable attachment to the choke member.

5. A mixing head according to claim 4, characterized in that said attachment comprises a pair of separate attachment pieces on either side of a passage between them.

6. A mixing head according to claim 4, characterized in that said attachment is positioned, in a movable manner, on the choke member and an adjusting member is provided which permits positioning of the passage through the attachment which differs from the passage through said choke member only during the mixing position of said choke member.

7. A mixing head according to claim 6, characterized in that one attachment piece of the pair is fixed to said choke member.

8. A mixing head according to claim 6, characterized in that a separate adjusting member is provided for each attachment piece.

9. A mixing head according to claim 4, characterized in that said attachment comprises several plates which are positioned parallel, one on top of another, and may be displaced relative to each other.

10. A mixing head according to claim 1, characterized in that the surface of said choke member or of said section of reduced area adjoining the mixing chamber, and the corresponding surface of the guide recess are provided with interacting profilings running in the direction of movement of the choke member.

* * * * *